(12) United States Patent
Knewtson

(10) Patent No.: US 6,694,585 B2
(45) Date of Patent: Feb. 24, 2004

(54) APPARATUS AND METHOD FOR SECURING END TURNS OF COIL SPRINGS TO A BORDER WIRE

(75) Inventor: Kelly M. Knewtson, Joplin, MO (US)

(73) Assignee: L&P Property Management Company, South Gate, CA (US)

( * ) Notice: Subject to any disclaimer, the term of this patent is extended or adjusted under 35 U.S.C. 154(b) by 138 days.

(21) Appl. No.: 10/147,767

(22) Filed: May 16, 2002

(65) Prior Publication Data

US 2003/0213110 A1 Nov. 20, 2003

(51) Int. Cl.[7] .................................................. B23P 19/00
(52) U.S. Cl. ......................... 29/91; 29/33 K; 29/896.9; 140/3 CA; 140/140
(58) Field of Search ........................ 29/91, 33 F, 33 K, 29/33 R, 896.9; 140/3 CA, 140

(56) References Cited

U.S. PATENT DOCUMENTS

| | | | |
|---|---|---|---|
| 405,821 A | 6/1889 | Bonnell et al. | |
| 2,016,872 A | 10/1935 | Olson | |
| 2,575,774 A | 11/1951 | Spuhl | |
| 2,763,296 A | 9/1956 | Lecoq | |
| 2,961,667 A | 11/1960 | Rymland | |
| 3,348,583 A | 10/1967 | Goldmeyer et al. | |
| 3,648,737 A | 3/1972 | Dull | |
| 3,837,633 A | 9/1974 | Paulsen | |
| 3,983,910 A | * 10/1976 | Dasher | 140/3 CA |
| 4,295,639 A | 10/1981 | Wells | |
| 4,472,849 A | 9/1984 | Langas | |
| 4,546,528 A | * 10/1985 | Langas | 29/243.56 |
| 4,611,640 A | 9/1986 | Baker et al. | |
| 4,705,079 A | * 11/1987 | Higgins | 140/3 CA |
| 4,724,590 A | 2/1988 | Langas et al. | |
| 4,765,053 A | * 8/1988 | Hoffa | 29/33 F |
| 4,815,182 A | 3/1989 | Langas et al. | |
| 4,829,643 A | 5/1989 | Langas et al. | |
| 4,907,327 A | 3/1990 | Ayres et al. | |
| 5,042,124 A | 8/1991 | Knopfel | |
| 5,497,541 A | 3/1996 | Nogueira | |
| 5,782,273 A | 7/1998 | Moser et al. | |
| 5,921,160 A | * 7/1999 | Yankaitis et al. | 140/140 |

* cited by examiner

Primary Examiner—Erica Cadugan
Assistant Examiner—Dana Ross
(74) Attorney, Agent, or Firm—Wood, Herron & Evans, L.L.P.

(57) ABSTRACT

The apparatus has an indexable carriage adapted to move the coil springs and the border wire along a path. A wire cutter disposed adjacent the path has an inner member with an axial hole adapted to receive the wire and a tubular outer member receiving the inner member and movable relative to the inner member. The outer member has a cutting edge. An actuator is operatively connected to one of the inner and outer members to provide a relative rotation between the inner and outer members. That relative rotation results in the wire being sheared by the cutting edge to provide a length of wire. A wire wrapping mechanism disposed adjacent the path receives the length of wire and wraps the length of wire around an end turn of a coil spring and a border wire.

21 Claims, 12 Drawing Sheets

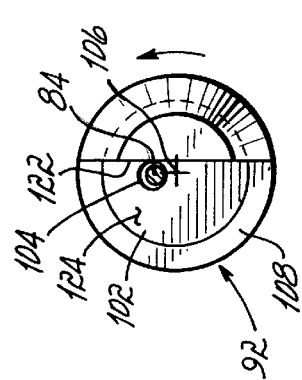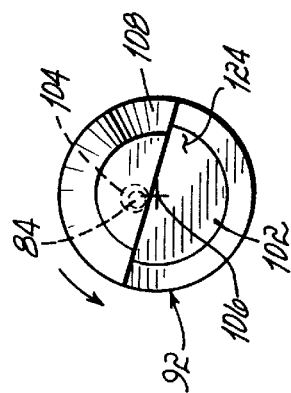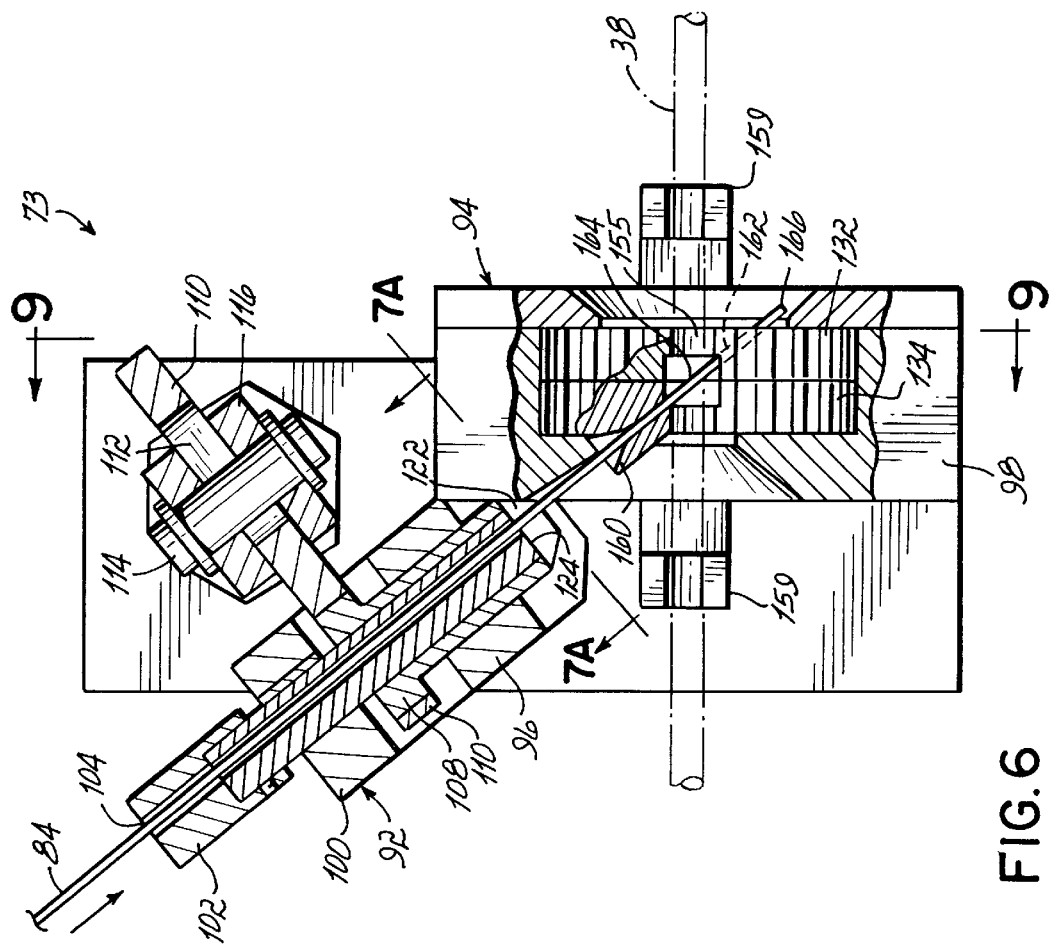

APPARATUS AND METHOD FOR SECURING
END TURNS OF COIL SPRINGS TO A
BORDER WIRE

FIELD OF THE INVENTION

This invention relates generally to the assembly of coil springs of the type used in bedding and upholstery and, more particularly, to an improved apparatus for attaching end turns of a coil spring to a border wire.

BACKGROUND OF THE INVENTION

In known assemblies of coil springs that are used in bedding and upholstery, adjacent rows of coil springs are connected by a helical lacing wire that is laced around adjacent portions of top and bottom turns of the coil springs. The lacing wire often extends from one side edge of the coil spring assembly to an opposite side edge to form a matrix of interconnected coil springs. In some applications, only the top turns or only the bottom turns are laced together. Thereafter, the coil spring matrix is converted into a completed coil spring assembly by attaching the coil springs to a border wire in either or both of the top and bottom planes of the spring unit. The border wire is generally a single heavy gauge wire preformed into a rectangular configuration and disposed in border fashion about the periphery of the coil spring matrix. The border wire is attached to the peripheral portion of the end turns of the spring coils by helical lacing wires, preformed metal clips, staples or separate lengths of straight wire. The attachment of the border wire to the matrix of coil springs is performed either manually or automatically.

At the present time, nearly all commercial fasteners used for attaching the border wire to the coil springs are sheet metal clips that are preformed and assembled into a string of clips. The string of clips is fed into a machine that applies the clips to a border wire and inner spring assembly being conveyed past the machine. The sheet metal clips have sharp edges and corners that often cause problems during the manufacturing process. For example, the corners of the clips can catch on fabric that is subsequently applied to the coil spring assembly. Any time fabric catches on a clip, some sort of special handling is required that adds cost to the manufacturing process. Further, any time the coil spring assembly is manually handled, care must be taken to avoid contact with the sharp edges and corners of the sheet metal clips.

Therefore, there is a need for an apparatus that connects coils springs to a border wire with fasteners that do not have sharp or pointed edges, corners or ends.

SUMMARY OF THE INVENTION

The present invention provides a wire cutting and wrapping apparatus that provides cut wire tips that are blunt. The wire cutting and wrapping apparatus of the present invention is especially useful for attaching coil springs to border wires in the manufacture of coil spring assemblies to be used for bedding and upholstery. By providing cut wire fasteners with blunt ends, a resulting coil spring assembly can be readily covered with a fabric without the fabric being unnecessarily caught or torn by the ends of the wire fasteners. In addition, the blunt tips of the wire fasteners provided by the wire cutting and wrapping apparatus of the present invention make the finished coil spring assembly much easier to manually handle.

According to the principles of the present invention and in accordance with the described embodiments, the invention provides an apparatus for attaching end turns of coil springs to a border wire. The apparatus has an indexable carriage adapted to move the coil springs and the border wire along a path. A wire cutter located adjacent the path has an inner member with an axial hole adapted to receive the wire and a tubular outer member receiving the inner member and movable relative to the inner member. The outer member has a cutting edge. An actuator is operatively connected to one of the inner member and the outer member to provide a relative rotation between the inner member and the outer member. That relative rotation results in the wire being sheared by the cutting edge to provide a length of wire. A wire wrapping mechanism located adjacent the wire cutter and the path receives the length of wire and wraps the length of wire around an end turn of a coil spring and a border wire.

In one aspect of the invention, the wire wrapping mechanism has a pair of gears rotatable with respect to a common axis of rotation. Each of the gears has a radial slot that receives an end turn of a coil spring and a border wire and a hole that receives the length of wire. A drive shaft is mechanically coupled to the pair of gears, and the drive shaft is operable to rotate each of the gears in a different direction to wrap the length of wire around the end turn of the coil and the border wire. In another aspect of the invention, the hole has a centerline nonparallel with respect to the common axis of rotation.

In another embodiment of the invention, a method is provided for attaching an end turn of a coil to a border wire. First, the end turn of a coil spring and a border wire are located in radial slots of respective gears, wherein the respective gears having a common axis of rotation. Next, a wire is fed through an axial hole of an inner member of a wire cutter. The wire cutter has a tubular outer member that receives the inner member, and the outer member has a cutting edge adjacent an end surface of the inner member. Next, the wire is fed through holes in the respective gears, and an actuator of the wire cutter is operated to provide a relative rotation between the inner member and the outer member. That relative rotation causes the cutting edge to pass over the axial hole of the inner member and shear the wire to a length. A drive shaft mechanically coupled to the two gears is then rotated to simultaneously rotate each of the two gears in a different direction and the length of the wire is wrapped around the end turn of the coil spring and the border wire located in the radial slots of the respective gears.

These and other objects and advantages of the present invention will become more readily apparent during the following detailed description taken in conjunction with the drawings herein.

BRIEF DESCRIPTION OF THE DRAWINGS

FIG. 6 is a centerline cross-sectional view of a wire cutter used on the wire fastening head of FIGS. 4 and 5.

FIGS. 7A and 7B are cross-sectional views taken along the line 7A—7A of FIG. 6 and illustrate the wire cutting operation of the wire cutter.

DETAILED DESCRIPTION OF THE INVENTION

Figure 1:
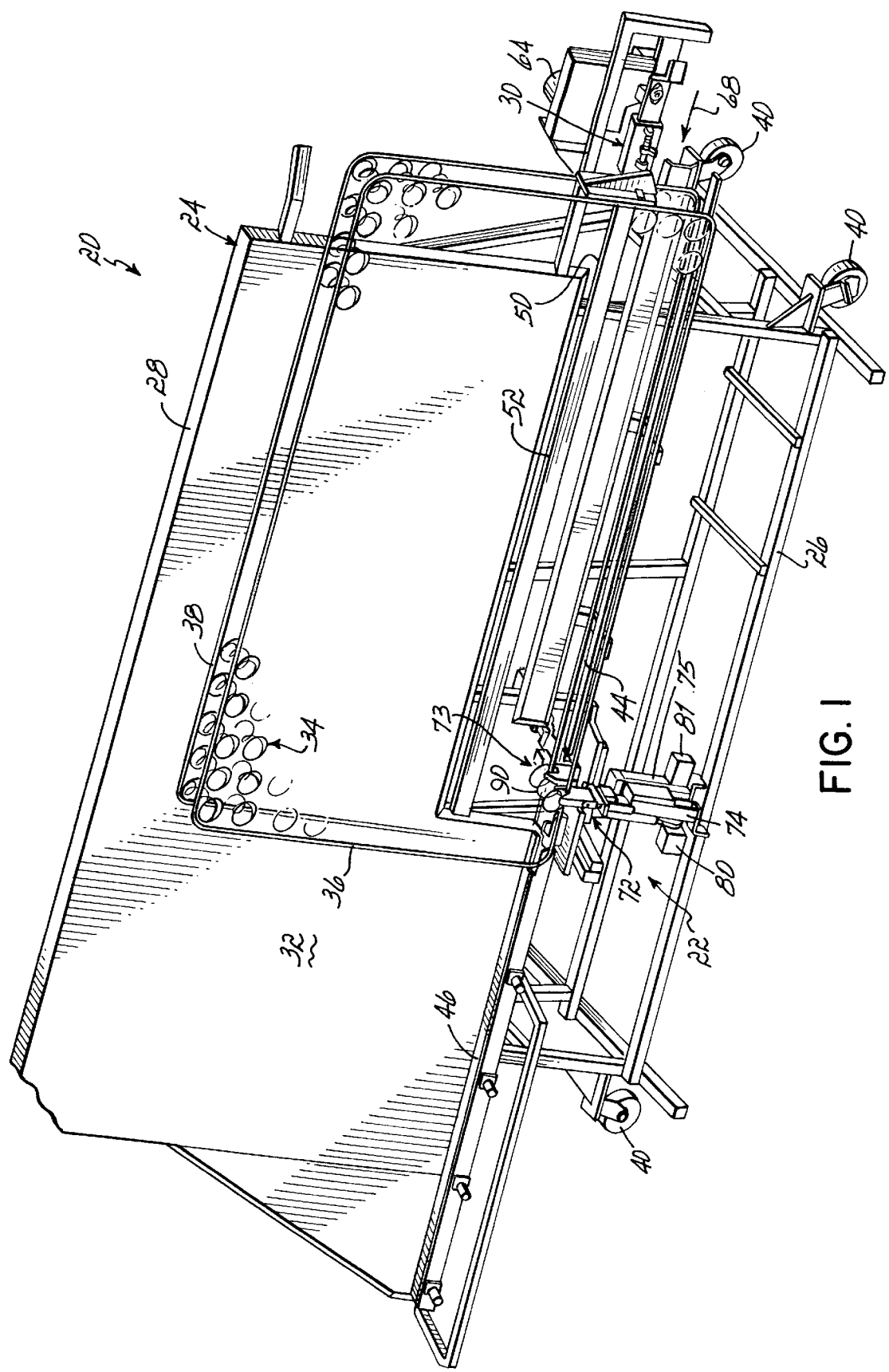
FIG. 1 is a perspective view of an inner spring and border wire fastening machine utilizing wire fastening heads in accordance with the principles of the present invention.
Figure 2:
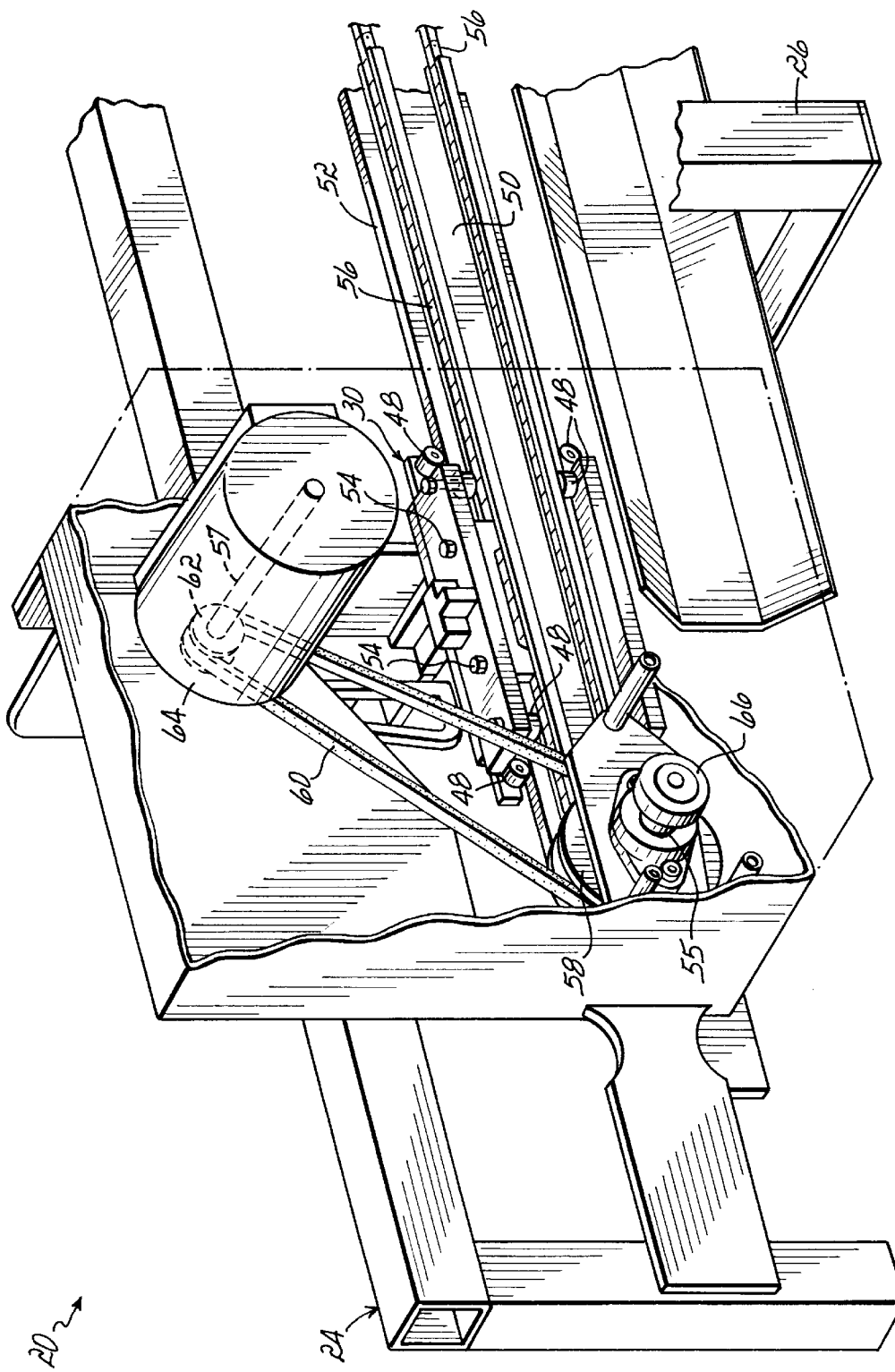
FIG. 2 is a partial perspective view of carriage drive mechanism used with the inner spring and border wire fastening machine of FIG. 1.
Figure 3:
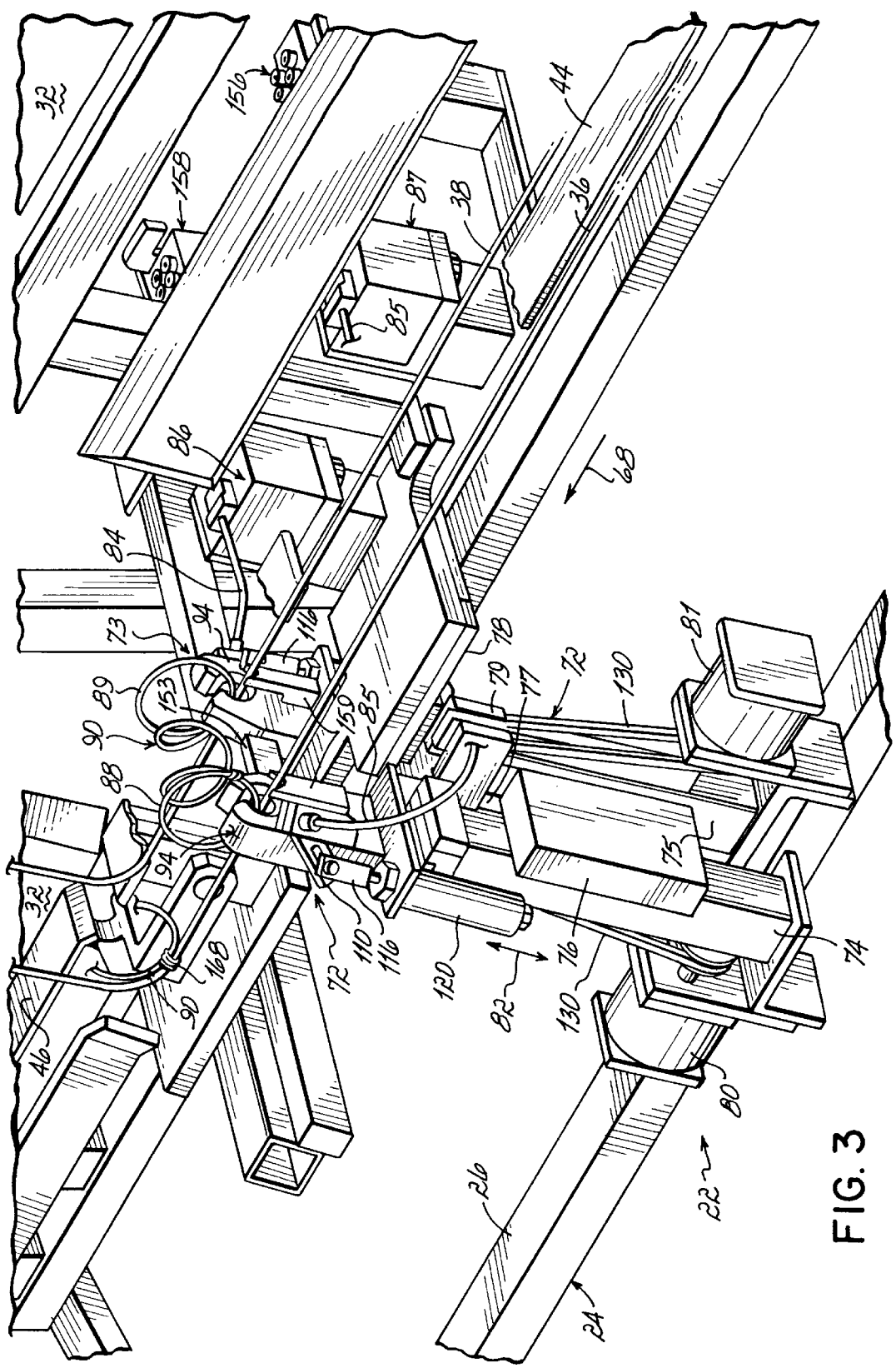
FIG. 3 is a partial perspective view of a wire wrap station on the inner spring and border wire fastening machine of FIG. 1.

Referring to FIGS. 1–3, a coil/border wire fastening machine 20 includes a wire wrapping station 22 and an inner spring feed and support structure 24. The support structure 24 includes a base 26 that carries a support table 28 and movable carriage 30. The support table 28 is tilted rearwardly at an angle of about 15° from vertical and is provided with a smooth-surfaced skin or facing 32, for example, a thin, lightweight aluminum sheeting or other material. The slight inclination of the table 28 from vertical maintains the center of gravity of a mattress spring assembly 34 and its associated front and rear border wires 36, 38, respectively, in a position such that they remain in contact with the facing 32 throughout the wire wrapping operation. The base 26 and support table 28 are fabricated of hollow bar stock utilizing a minimum number of structural elements consistent with providing a self-supporting, high strength, stable, relatively lightweight unit. The base 26 further includes casters 40 that permit the machine to be moved to different locations. The front of the base 26 is provided with support tube 44 on which the spring assembly 34 rests. The border wires 36, 38 do not rest on the support tube 44. The spring assembly and border wires 36, 38 are advanced together in the direction of the wire wrapping station 22. After the spring assembly 34 and border wires 36, 38 have moved through the wire wrapping station 22 and advanced onto a paddle-like member 46, the member 46 is rotated through an angle of about 90° to position another edge of the spring assembly 34 on the support tube 44.

The spring assembly 34 and border wires 36, 38 are moved toward and away from the wire wrapping station 22 by the movable carriage 30. Referring to FIG. 2, the carriage 30 is provided with a plurality of rollers 48 that ride along the upper and lower margins and against an inner wall 50 of guide plate 52. The carriage 30 has pins 54 that engage an endless chain 56 driven by a sprocket (not shown) in a known manner. The sprocket is connected to a drive shaft 55 on which a pulley 58 is also mounted. The pulley 58 is driven by a belt 60 connected to a pulley 62 mounted on an output shaft 57 of a servomotor 64. A pulse encoder 66 is mounted on the drive shaft 55 and provides a feedback signal representing travel of the carriage 30 toward and away from the wire wrapping station 22. The inner spring feed and support structure 24 is substantially similar to a support described and illustrated in U.S. Pat. No. 4,829,643 entitled "Apparatus and Method for Automatically Securing Border Wires on Mattress Innersprings", which patent is hereby incorporated in its entirety by reference herein.

Referring to FIG. 3, the wire wrapping station 22 includes front and rear wire fastening heads 72,73, respectively. Each of the wire wrap heads 72, 73 has a respective positioning actuator 74, 75, for example, a cylinder, mounted on a respective fixed bearing block 76, 77. Each of the bearing blocks 76, 77 is mounted to a lower side of a plate 78 via brackets 79. Front and rear wire wrap servomotors 80, 81 are mounted to the ends of respective cylinders 74, 75. Operation of the cylinders 74, 75 moves the cylinder 74, 75 and the associated front and rear wire wrap heads 72, 73 in a generally vertical direction 82 relative to the respective fixed bearing blocks 76, 77 and into alignment with the respective front and rear border wires 36, 38. Wire wrapping operations are then executed during which wires 84, 85 are fed to the respective front and rear wire wrap heads 72, 73 from respective wire feeders 86, 87 (FIG. 1). The wire wrap heads 72, 73 cut the respective wires 84, 85 to a predetermined length and wrap the cut lengths around respective border wires 36, 38 and adjacent end turns 88, 89 of a border coil 90 in the spring assembly 34.

Figure 4:
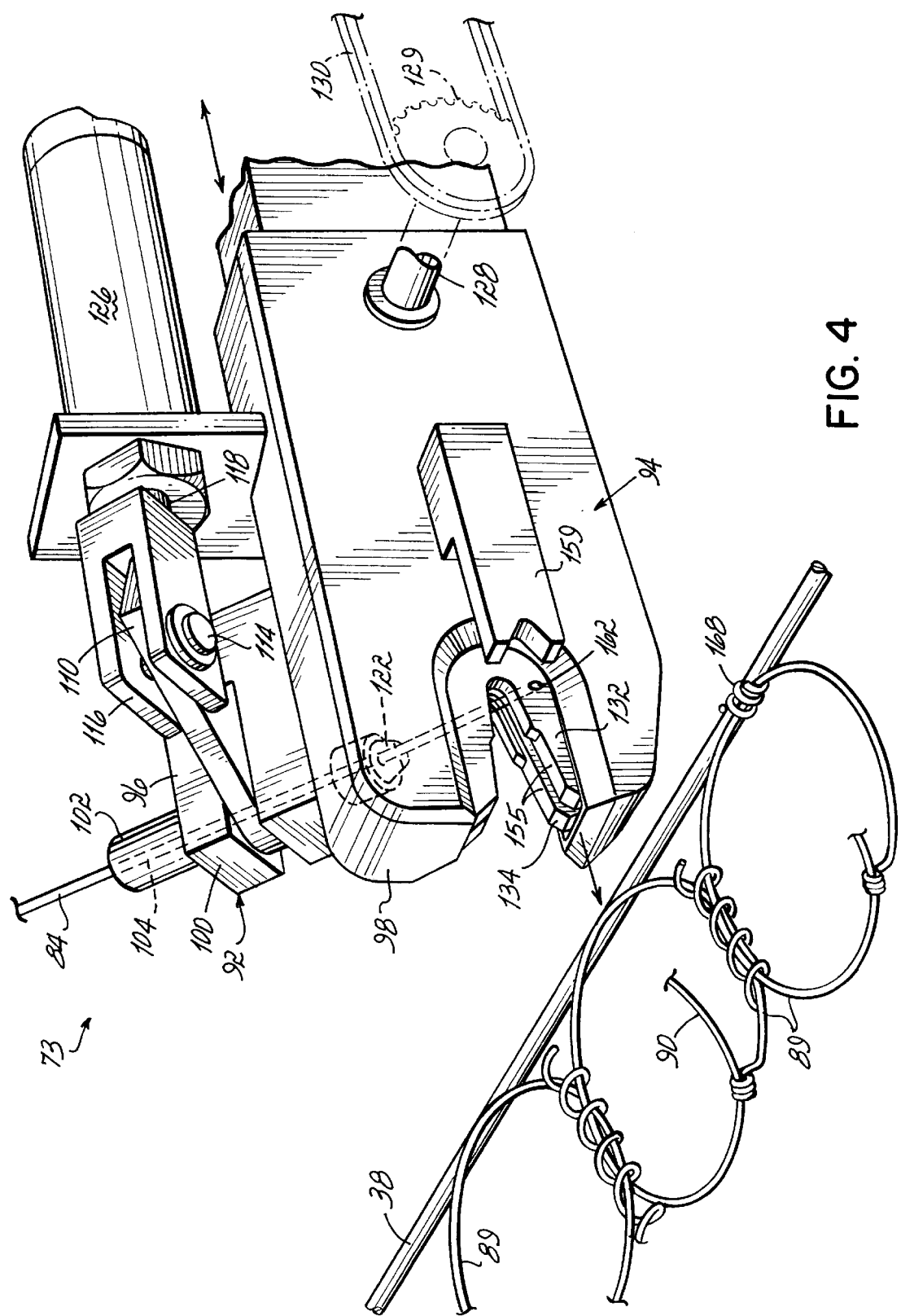
FIG. 4 is a perspective view of one side of the wire fastening head used on the inner spring and border wire fastening machine of FIG. 1.
Figure 5:
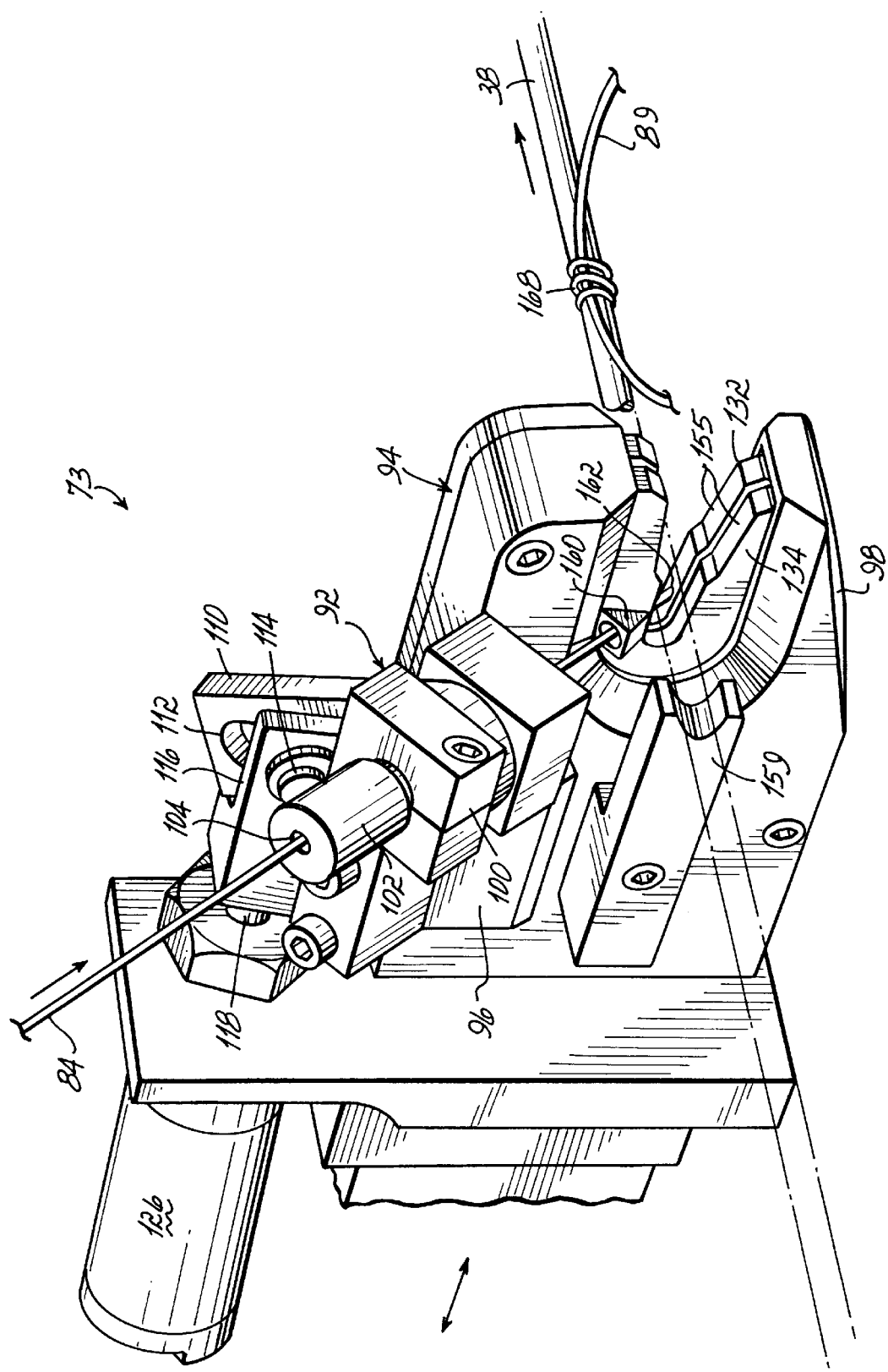
FIG. 5 is a perspective view of an opposite side of the wire fastening head used on the inner spring and border wire fastening machine of FIG. 1.

The construction and operation of the front and rear wire fastening heads 72, 73 are identical, and therefore, only the construction and operation of the rear wire fastening head 73 will be described in detail. Referring to FIGS. 4 and 5, the wire fastening head 73 is comprised of a wire cutter 92 and a wire wrapper 94. The wire cutter 92 has a bracket 96 that is bolted to a gear box or body 98 of the wire cutter 94. The bracket 96 has a clamp 100 that holds a wire guide 102. The wire guide 102 is made from a hardened steel and has a longitudinal bore or hole 104 for receiving and guiding the wire 84. As shown in FIGS. 6 and 7A, the hole 104 is offset from, and does not intersect, the longitudinal centerline 106 of the guide tube 102. A steel sleeve 108 is rotatably mounted on the guide tube 102. The sleeve 108 has a lever arm 110 extending radially therefrom. The lever arm includes a slot 112 that receives a drive pin 114 extending across a clevis 116 mounted on a distal end of a rod 118 (FIG. 5). The rod 118 is reciprocated by operation of a cylinder 126, thereby moving the lever 110 and sleeve 108 through an arc of about 90°. With the rod 118 fully retracted into the cylinder 126, the wire 84 extends through the guide tube 102 (FIGS. 6–7A) and past a cutting or shearing edge 122 mounted on the end of the rotatable sleeve 108. The shearing edge 122 is located immediately adjacent a lower end surface 124 of the guide tube 102. Operating the cylinder 126 moves the rod 118 outward, thereby moving the sleeve 108 in a generally counterclockwise direction as viewed in FIG. 7A. Sleeve 108 is moved approximately 90° and the cutting edge 122 moves across the feed hole 104, thereby shearing the wire 84 to its desired length.

Figure 8:
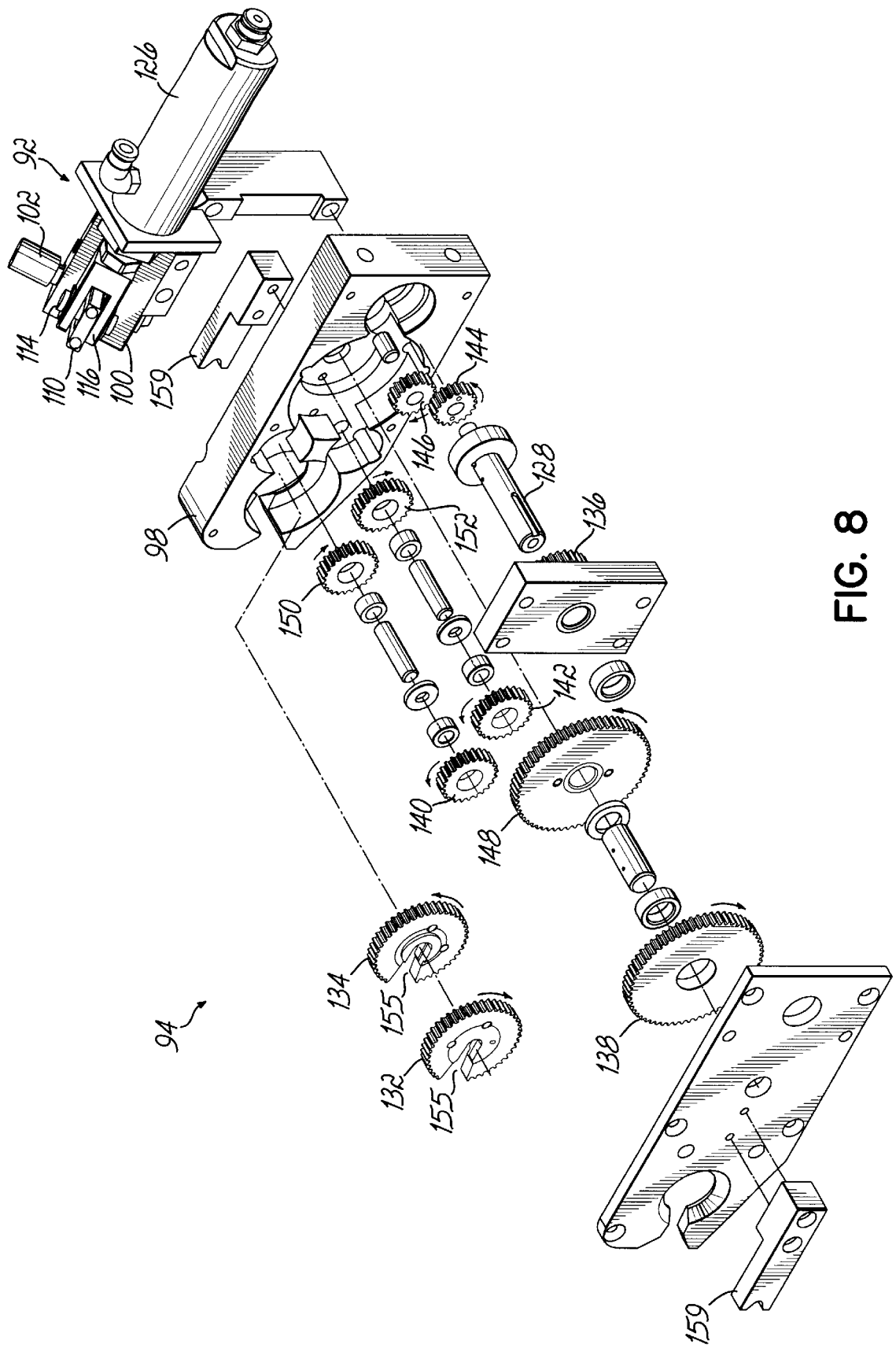
FIG. 8 is a disassembled perspective view of the gear drive for a wire wrapper used on the wire fastening head of FIGS. 4 and 5.

Referring to FIG. 4, the wire wrapper 94 is operated by a drive shaft 128 that is connected via a sprocket 129 and chain 130 to the rear wire wrap servomotor 81 (FIG. 3). The drive shaft 128 is rotatably mounted in the gear box 98. Referring to FIG. 8, the wire wrapping action is provided by two counter rotating wire wrap gears 132, 134. Rotation of the drive shaft 128 in a counterclockwise direction, as viewed in FIGS. 8 and 9, also rotates a first drive gear 136 counterclockwise. That rotation causes a clockwise rotation of the larger gear 138 that, in turn, simultaneously rotates gears 140, 142 counterclockwise. The gears 140, 142 mesh with the first wire wrapping gear 132 and turn it clockwise. Simultaneously, the counterclockwise rotation of the drive shaft 128 rotates drive gears 144, 146 in the counterclockwise and clockwise directions, respectively. The clockwise rotating gear 146 meshes with gear 148 and turns it counterclockwise. The counterclockwise rotation of the gear 148 causes a clockwise rotation of the gears 150, 152 that, in turn, rotate the second wire wrapping gear 134 in a counterclockwise direction. Thus, rotation of the drive shaft 128 creates opposite rotations of the first and second wire wrap gears 132, 134.

In use, referring to FIG. 1, a spring assembly 34 with forward and rear border wires 36, 38, respectively, is placed on the support tube 44 of the base 26 and is also supported by the surface 32 of the table 28. A control 154 (FIG. 9) is operated to initiate a wire fastening cycle. The control 154 may be any suitable controller, for example, a programmable logic control. The control 154 first provides output signals to command the carriage servomotor 64 to index the carriage 30 along a linear path in a direction indicated by the arrow 68. The indexing carriage 30 pulls the spring assembly 34 and border wires 36, 38 over the support tube 44 until end turns 88, 89 (FIG. 3) of a border coil 90 are adjacent the wire wrap station 22. The desired location of each coil is detected by a coil sensor 153 (FIG. 3) that provides a feedback signal to the control 154, and the control 154 commands the carriage servomotor 64 to stop in response to the feedback signal from the coil sensor 153. The coil sensor 153 can be any proximity sensor that is effective to detect coil presence such that an axial centerline of the coil is substantially in line with the axis of rotation of the wire wrap gears 132, 134 (FIG. 8). When properly located, the front and rear end turns 88, 89 are positioned immediately adjacent and above the front and rear wire fastening heads 72, 73, respectively. When the carriage 30 has been moved to the desired position, the control 154 stops the operation of the carriage servomotor 64 and initiates operation of the front and rear head position actuators 74, 75.

Figure 9:
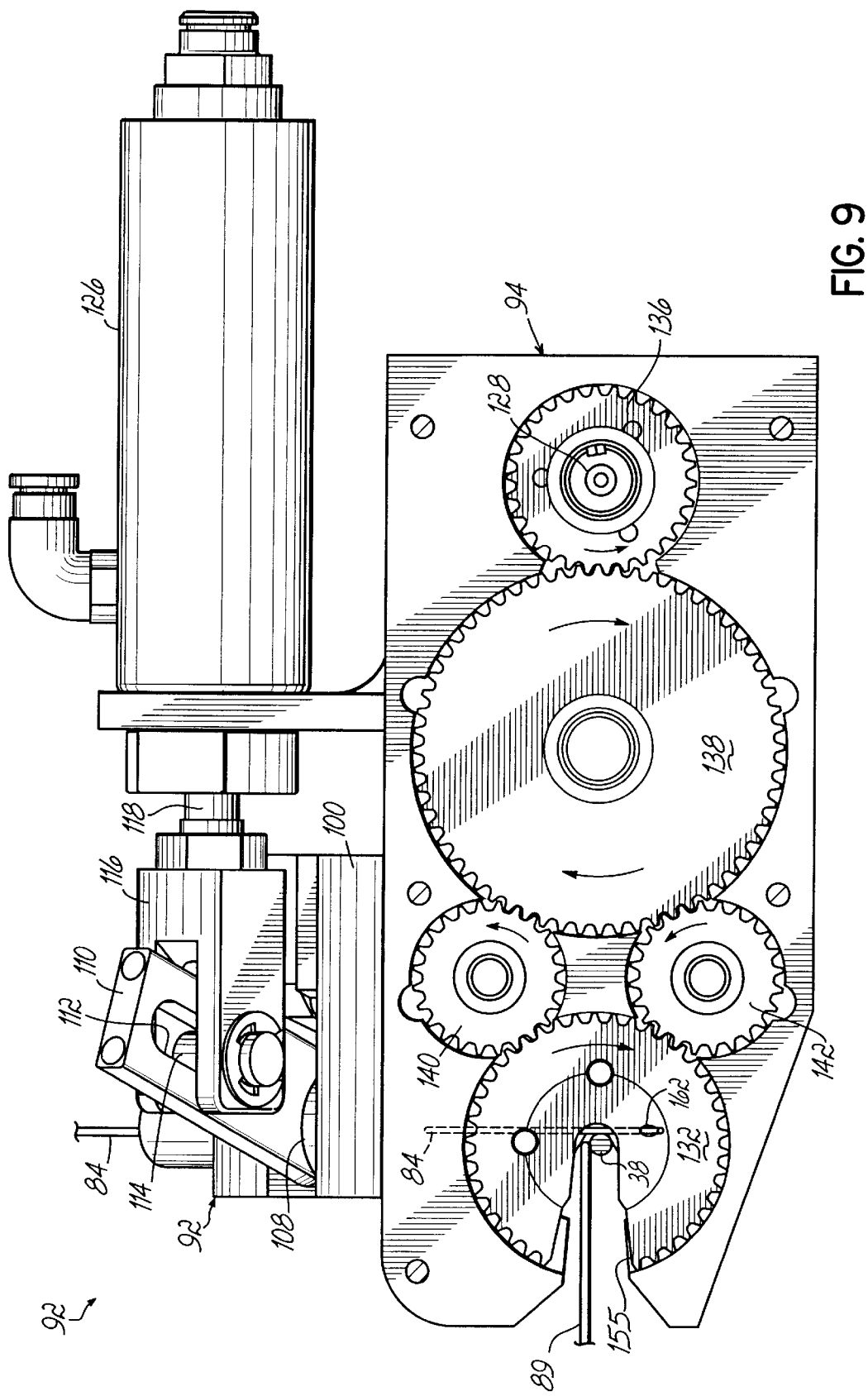
FIG. 9 is a cross-sectional view taken along line 9—9 of FIG. 6 and is an end view of the gear drive for the wire wrapper used on the wire fastening head of FIGS. 4–6.

The head position actuators 74, 75 can be any actuators that are effective to selectively raise and lower the respective wire fastening heads 72, 73. When the control 154 commands the head position actuators 74, 75 to raise, the wire fastening heads 72, 73 are elevated and the end turns 88, 89 and respective border wires 36, 38 are received in radial slots 155 (FIG. 8) located in each of the wire wrap gears. When the wire fastening heads 72, 73 are fully elevated, the border wires 36, 38 are located in the slots 155 approximately coincident with a centerline axis of rotation of the wire wrap gears 132, 134 as shown in FIG. 9. Simultaneously, as shown in FIGS. 5 and 6, the border wire 36 is located in border wire support brackets 159 that are located on opposite sides of the gear box 98 of the wire wrapper 90.

As will be appreciated, the operation of wire fastening heads 72, 73 is substantially identical, and therefore, the operation of only wire fastening head 73 will be described in detail. The control 154 initiates operation of a wire feed servomotor 156 (FIG. 10) associated with the wire feeder 86 (FIG. 3). The wire feeder 86 feeds the wire 84 through the longitudinal bore 104 (FIG. 6) of the wire guide tube 102 of the wire cutter 92. The wire 84 is further fed through a guide block 160 that is attached to a side face of the wire wrap gear 134. The wire is further fed through a hole 162 in the wire wrap gear 132. The control 154 terminates the operation of wire feed servomotor 156 when the proper length of wire 84 has been fed into the wire fastening head 73. The proper length of wire is a length such that the point 164 where the wire 84 passes between the wire wrap gears 132, 134 is a midpoint between a distal end 166 and an end surface 124 of the wire guide 102.

Figure 10:
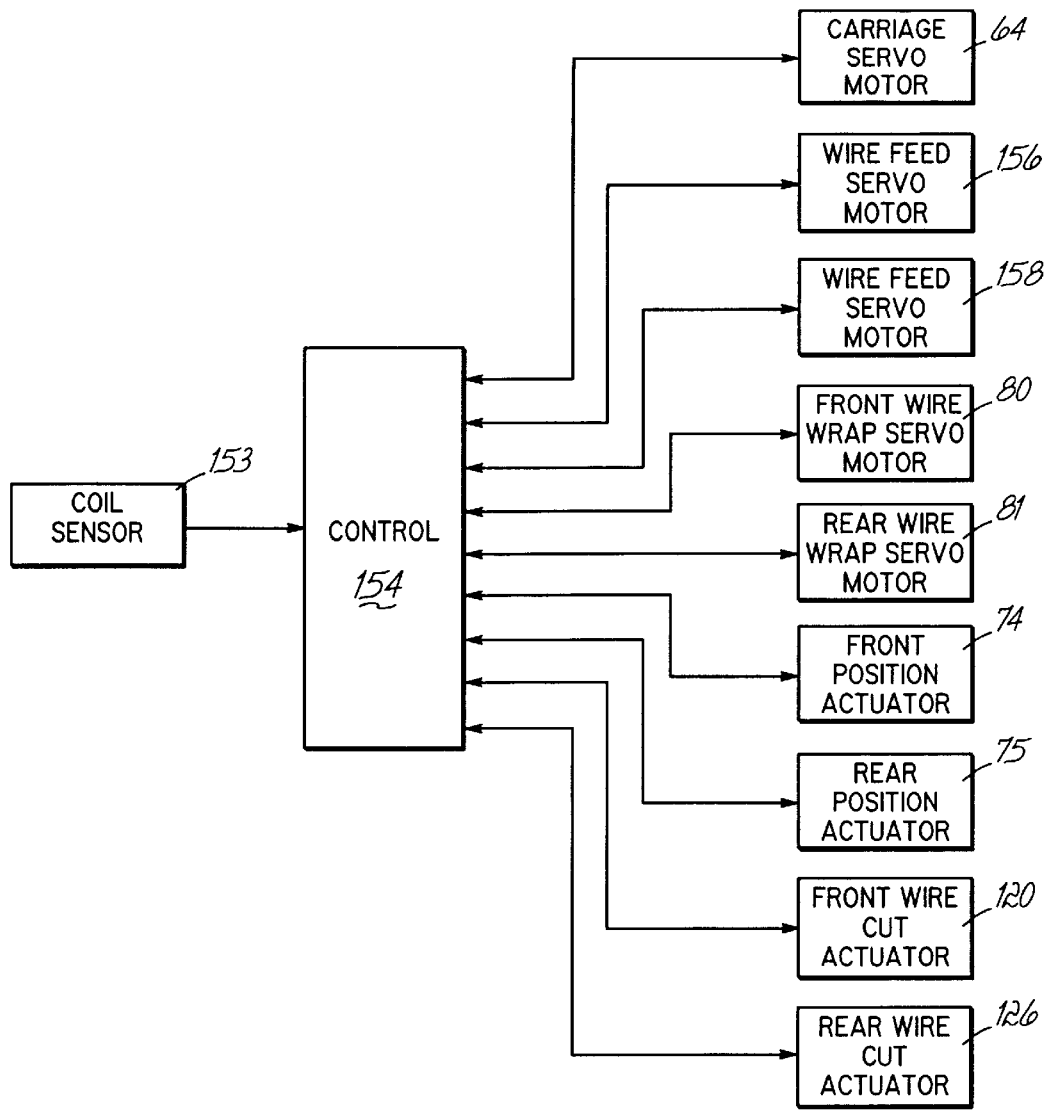
FIG. 10 is a schematic block diagram of a control system for the inner spring and border wire fastening machine of FIG. 1.
Figure 11:
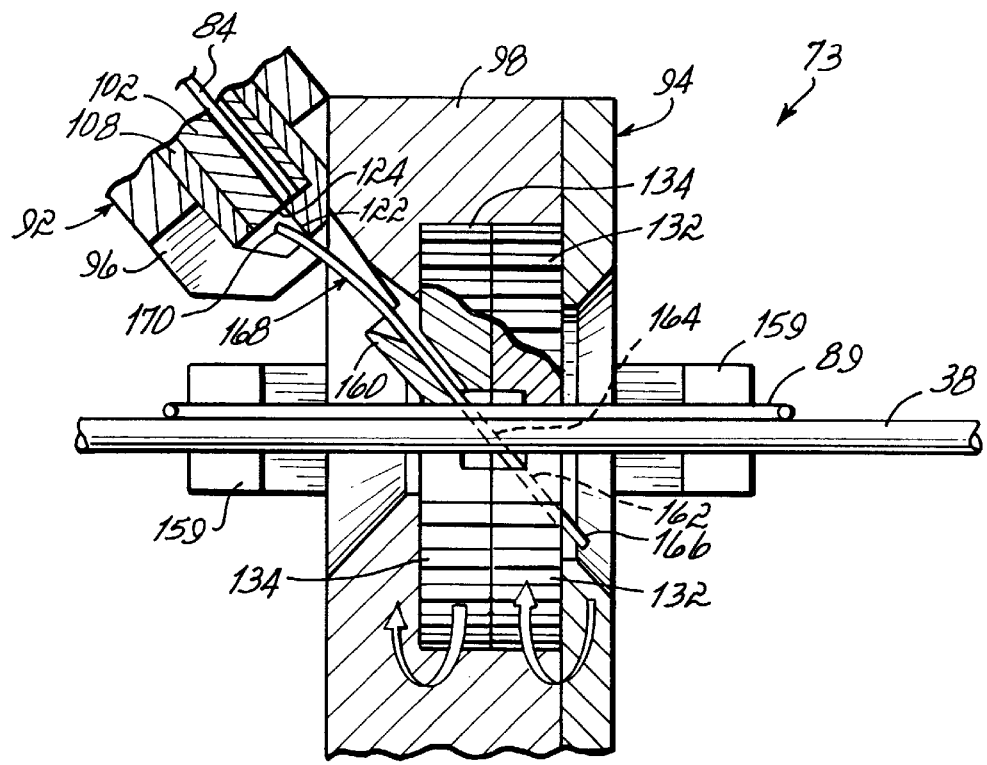
FIG. 11 is a cross-sectional view similar to FIG. 6 of the wire fastening head and illustrates a cut length of wire prior to a wire wrapping operation.
Figure 13:
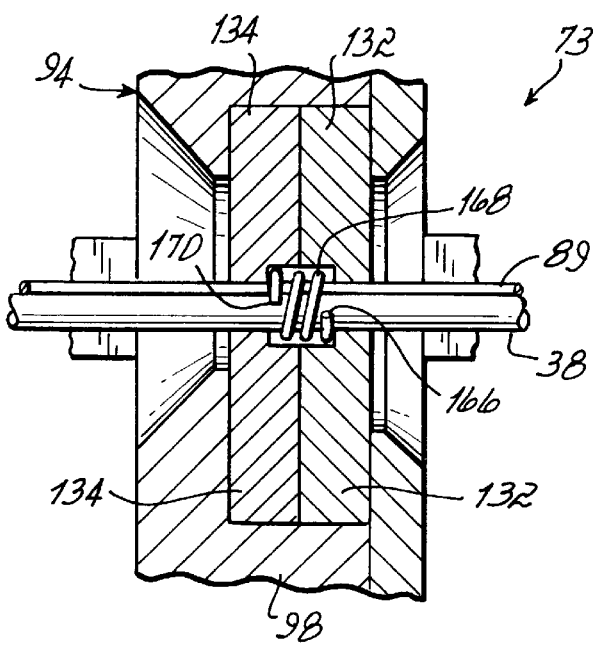
FIG. 13 is another cross-sectional view similar to FIG. 11 of the wire fastening head illustrating the cut length of wire after the wire wrapping operation.
Figure 12A:
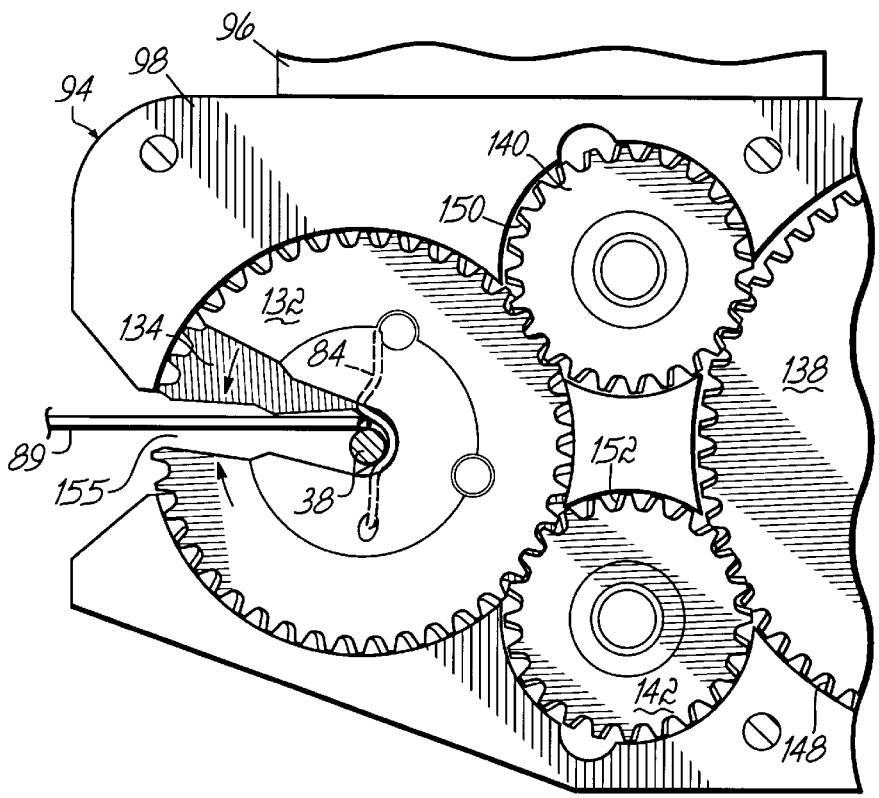
FIGS. 12A–12C are cross-sectional views similar to FIG. 9 of the wire fastening head that illustrate the wire wrapping process.
Figure 12B:
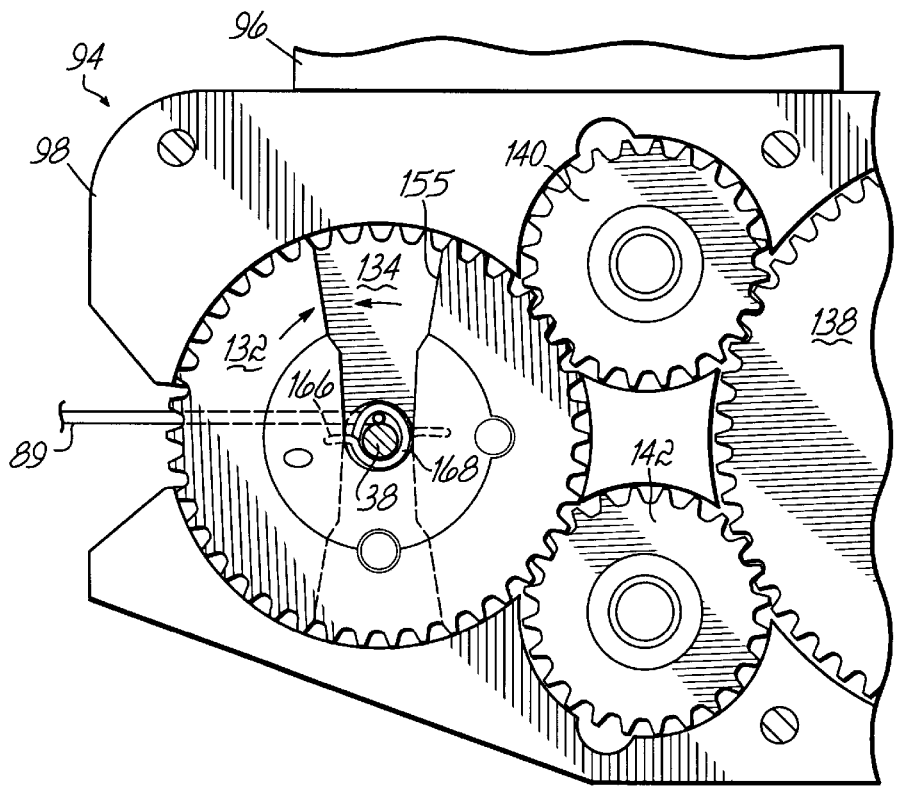
Figure 12C:
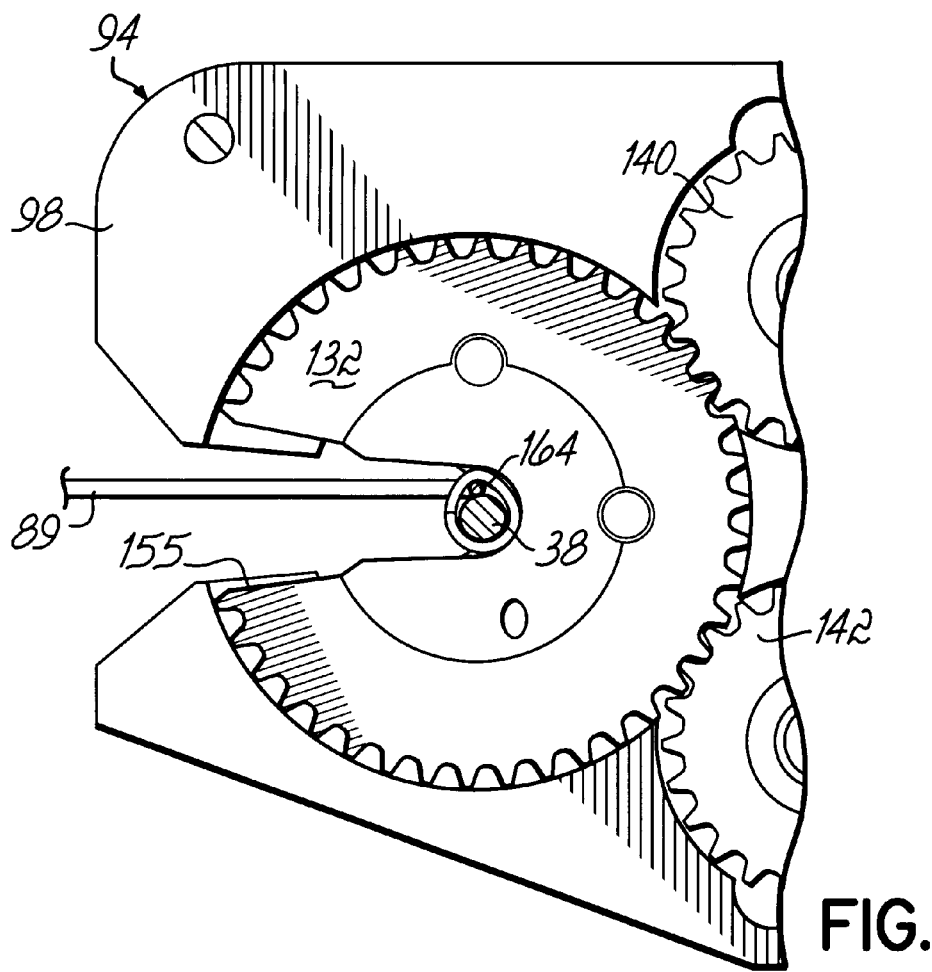

Thereafter, the control 154 provides output signals to command operation of the wire cut actuators 120, 126 (FIG. 10). Again, the operation of the wire cut actuators 120, 126 is identical, and only the operation of the wire cut actuator 126 will be described in detail. Referring to FIG. 4, operating the actuator 126 moves the rod 118 outward, thereby rotating the sleeve 108 and the cutting edge 122 (FIG. 7A). After the sleeve 108 moves through an angle of about 90° as shown in FIG. 7B, the wire 84 is sheared such that it has a relatively smooth cut end. The control 154 then reverses the operation of the actuator 126, thereby retracting the rod 118 and returning the sleeve 108 and cutting edge 122 to their original positions as illustrated in FIG. 7A. Referring to FIG. 11, a cut length of wire 168 is now located within the wire wrap gears 132, 134 adjacent end turn 89 and border wire 38. At this point, the control 154 commands the wire wrap servo motors 80, 81 (FIG. 3) of the respective wire fastening heads 72, 73 to rotate the servo motors through four full revolutions. Rotation of the drive shaft 128 (FIG. 4) causes the wire wrap gears 132, 134 to rotate in opposite directions. Thus, referring to FIG. 11, the wire wrap gear 132 wraps one end 166 of the cut length of wire 168 in a first longitudinal direction along the border wire 38, for example, to the right as viewed in FIG. 11. Simultaneously, the wire wrap gear 134 wraps the opposite end 170 of the cut wire 168 in the opposite longitudinal direction along the border wire 38, for example, to the left as viewed in FIG. 11. The wire wrapping process resulting from one revolution of the counter-rotating wire wrapping gears 132, 134 is shown in FIGS. 12A–12C and 13. Rotating the drive shaft 128 through two revolutions results in one revolution of the counter-rotating wire wrap gears 132, 134. Thereafter, the control 154 commands the wire wrap servo motors 80, 81 to rotate the drive shaft 128 through an additional two revolutions, thereby further working and smoothing the wire length 168 around the end turn 89 and border wire 38.

Thereafter, the control 154 reverses the operation of the head position actuators 74, 75 to lower the wire fastening heads 72, 73 to their original positions away from the border wires 36, 38. The carriage motor 64 is again operated by the control 154 to increment the carriage 30 through a displacement equal to the coil pitch, that is, the distance between the centerlines of the border coils 90 in the spring assembly 34. Thus, the end turns of an adjacent border coil are located above the wire fastener heads 72, 73 at the wire wrap station 22. The operation previously described is then repeated. After the end turns of each of the border coils along one edge of the inner spring have been fastened to the border wires 36, 38, the paddle-like member 46 is rotated in a known manner, thereby rotating the spring assembly 34 and border wires 36, 38 about 90°. The wire wrapping operation continues until all of the end turns of the border coils around the perimeter of the spring assembly 34 have been fastened by wire wrapping to the border wires 36, 38.

The wire fastening heads 72, 73 provide cut wire tips that are blunt. Thus, the cut wire with blunt ends permits a resulting coil spring assembly to be readily covered with a fabric without the fabric being unnecessarily caught or torn by the ends of the wire fasteners. In addition, the blunt tips of the wire fasteners provided by the wire wrapping mechanisms make the finished coil spring assembly much easier to manually handle. This is a substantial improvement over known wire attachments that produce a cut wire tip that often has some pointed shape. A pointed shape may be the result of the wire cutting edge not moving perpendicular to the wire centerline; the wire not being firmly supported during the cutting operation; or the structure of the wire cutter results in a working of the wire tip that produces a pointed shape.

While the invention has been illustrated by the description of one embodiment and while the embodiment has been described in considerable detail, there is no intention to restrict nor in any way limit the scope of the appended claims to such detail. Additional advantages and modifications will readily appear to those who are skilled in the art. For example, in the described embodiment.

Therefore, the invention in its broadest aspects is not limited to the specific details shown and described. Consequently, departures may be made from the details described herein without departing from the spirit and scope of the claims which follow.

What is claimed is:

1. An apparatus for attaching end turns of coil springs to a border wire comprising:
   an indexable carriage adapted to move the coil springs and the border wire along a path;
   a wire cutter disposed adjacent the path and adapted to shear a wire comprising
      an inner member having an axial hole adapted to receive the wire,
      a tubular outer member receiving the inner member and movable relative to the inner member, and
      a cutting edge mounted on the outer member, and
      an actuator operatively connected to one of the inner member and the outer member to provide a relative rotation between the inner member and the outer member and causing the wire to be sheared by the cutting edge to provide a length of wire; and
   a wire wrapping mechanism disposed adjacent the wire cutter and the path and adapted to receive the length of wire and wrap the length of wire around an end turn of a coil spring and a border wire.

2. The apparatus of claim 1 wherein the wire wrapping mechanism comprises:
   a pair of gears rotatable with respect to a common axis of rotation and having
      respective radial slots adapted to receive an end turn of a coil spring and the border wire, and
      respective holes adapted to receive the length of wire; and
   a drive shaft mechanically coupled to the pair of gears, the drive shaft operable to rotate each of the gears in a different direction to wrap the length of wire around the end turn of the coil and the border wire.

3. The apparatus of claim 2 wherein the respective holes have respective centerlines nonparallel with respect to the common axis of rotation.

4. An apparatus for wrapping lengths of wire around end turns of respective coil springs and a border wire surrounding the coil springs, the apparatus comprising:
   a wire cutter adapted to shear a wire into a length of wire comprising
      an inner member having an axial hole adapted to receive the continuous wire,
      a tubular outer member receiving the inner member and movable relative to the inner member, and
      a cutting edge mounted on the outer member, and
      an actuator operatively connected to one of the inner member and the outer member to provide a relative rotation between the inner member and the outer member and causing the continuous wire to be sheared by the cutting edge to provide the length of wire; and
   a wire wrapping mechanism located adjacent the wire cutter and adapted to receive an end turn of a coil, a border wire and the length of wire and wrap the length of wire around the end turn of the coil spring and the border wire.

5. The apparatus of claim 4 wherein the relative rotation of the inner member with respect to the outer member is with respect to a cutter axis of rotation and the axial hole through the inner member is substantially parallel to and radially offset from the cutter axis of rotation.

6. The apparatus of claim 5 wherein the wire has a cross-sectional area and the axial hole through the inner member has a cross-sectional area slightly larger than the cross-sectional area of the wire.

7. The apparatus of claim 6 wherein the cross-sectional area of the axial hole does not intersect the cutter axis of rotation.

8. The apparatus of claim 7 wherein the inner member has an end face substantially perpendicular to the cutter axis of rotation.

9. The apparatus of claim 8 wherein the cutting edge on the outer member is located immediately adjacent the end face of the inner member.

10. The apparatus of claim 9 wherein the cutting edge extends diametrically across the outer member.

11. The apparatus of claim 10 wherein the cutting edge intersects the cutter axis of rotation.

12. The apparatus of claim 11 wherein the cross-sectional area of the axial hole in the inner member is substantially circular.

13. The apparatus of claim 12 wherein the inner member of the wire cutter is fixed with respect to the outer member.

14. The apparatus of claim 13 wherein the inner member is substantially cylindrical.

15. The apparatus of claim 4 wherein the actuator comprises a movable element and the tubular member comprises a lever arm having an inner end connected to the tubular outer member and an outer end pivotally connected to the movable element of the actuator.

16. The apparatus of claim 4 wherein the wire wrapping mechanism comprises:
   a pair of gears rotatable with respect a common axis of rotation and having
      respective radial slots adapted to receive the end turn of the coil spring and the border wire, and
      respective holes adapted to receive the length of wire; and
   a drive shaft mechanically coupled to the pair of gears, the drive shaft operable to rotate the gears in opposite directions and wrap the length of wire around the end turn of the coil spring and the border wire.

17. The apparatus of claim 16 wherein the respective holes have centerlines nonparallel with respect to the common axis of rotation.

18. The apparatus of claim 17 further comprising a wire guide block mounted on a side of one of the gears, the wire guide block have a through hole contiguous with the hole in the one of the gears.

19. The apparatus of claim 18 further comprising a wire bracket adapted to support a border wire upon the border wire being received in one of the radial slots of a respective gear.

20. A method for attaching end turns of coil springs to a border wire comprising:

(a) supporting a matrix of coil springs and a border wire with respect to an indexable carriage;

(b) operating the indexable carriage to locate a coil spring and the border wire with respect to a wire wrapping mechanism;

(c) locating an end turn of the coil spring and the border wire in radial slots of respective gears, the gears having a common axis of rotation;

(d) feeding a longer wire through an axial hole of an inner member of a wire cutter, the wire cutter having a tubular outer member receiving the inner member, the outer member having a cutting edge adjacent an end surface of the inner member;

(e) feeding the longer wire through holes of the respective gears;

(f) operating an actuator of the wire cutter to provide a relative rotation between the inner member and the outer member, the relative rotation moving the cutting edge over the axial hole in the inner member and shearing a shorter length of wire from the longer wire;

(g) rotating a drive shaft mechanically coupled to the two gears to simultaneously rotate one of the gears in one direction and another of the gears in an opposite direction to wrap the shorter length of wire around the end turn of the coil spring and the border wire located in the respective radial slots of the two gears;

(h) operating the indexable carriage to locate another coil spring and the border wire with respect to the wire wrapping mechanism; and (i) iterating steps (c) through (h) for all of the coil springs adjacent the border wire.

21. The method of claim 20 further comprising feeding the longer wire through holes of the respective gears, the holes having respective centerlines angled with respect to the common axis of rotation.

* * * * *